(12) United States Patent
    Evans (10) Patent No.: US 6,222,959 B1
(45) Date of Patent: Apr. 24, 2001

(54) NONLINEAR OPTICAL LOOP MIRROR WITH ADIABATIC PULSE COMPRESSION

(75) Inventor: Alan F. Evans, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/530,017

(22) PCT Filed: Sep. 25, 1998

(86) PCT No.: PCT/US98/20044

§ 371 Date: Apr. 21, 2000

§ 102(e) Date: Apr. 21, 2000

(87) PCT Pub. No.: WO99/21037

PCT Pub. Date: Apr. 29, 1999

Related U.S. Application Data

(60) Provisional application No. 60/063,029, filed on Oct. 23, 1997.

(51) Int. Cl.[7] .................. G02B 6/26; G02B 6/42

(52) U.S. Cl. .............................................. 385/27
(58) Field of Search .................. 385/27, 37, 39, 385/122, 124; 372/6, 18, 94; 359/110, 174, 177, 333, 337, 341

(56) References Cited

U.S. PATENT DOCUMENTS

| | | |
|---|---|---|
| 5,359,612 | 10/1994 | Dennis et al. .................. 372/18 |
| 5,363,386 | 11/1994 | Smith ............................. 372/6 |
| 5,365,531 | 11/1994 | Lin et al. ....................... 372/18 |
| 5,574,534 | 11/1996 | Nogiwa et al. ................ 359/337 |

*Primary Examiner*—Akm E. Ullah
(74) *Attorney, Agent, or Firm*—William J. Chervenak (57) ABSTRACT

A nonlinear optical loop mirror is combined with a pulse compressor. The nonlinear loop mirror receives both control pulses and data pulses and further transmits selected data pulses in accordance with relative amounts of overlap between individual control and data pulses. The pulse compressor compresses at least one of the control and data pulses for improving the transmission efficiency of the selected data pulses and reducing crosstalk with the remaining data pulses.

62 Claims, 4 Drawing Sheets

NONLINEAR OPTICAL LOOP MIRROR WITH ADIABATIC PULSE COMPRESSION

This application is a 371 of PCT/US98/20044 filed Sep. 25, 1998 and also claims benefit to Provisional Application 60/063,029 filed Oct. 23, 1997.

TECHNICAL FIELD

Pulse narrowing technology is combined with nonlinear optical loop mirrors to enhance management of optical pulses.

BACKGROUND

Nonlinear optical loop mirrors (NOLMs), which are fiber versions of Sagnac interferometers, can perform many different functions in optical systems including multiplexing and demultiplexing, switching, amplifying, logical operations, pulse shaping, filtering, and signal regeneration. Processing speeds are extremely fast, accommodating bit rates approaching terabit per second speeds.

Pulse routing through nonlinear optical loop mirrors is controlled by the mechanism of interference. A two-by-two directional coupler divides a data (signal) pulse train into two pulse trains that counter propagate around a common loop of fiber. Phase modulation induced by intensities within the nonlinear optical regime of the fiber (the Kerr effect) alters the relative phases of the paired counter propagating pulses. Upon return to the directional coupler, the recombined pulses are switched between the input and output of the coupler in accordance with their interference properties. Constructively interfering pulses reflect back through the coupler's input, and destructively interfering pulses transmit through the coupler's output.

Normally, the directional coupler is a 3 dB coupler, splitting input pulse intensities equally between the counter propagating directions. If the optical properties exhibited by the fiber loop are symmetric in both directions of propagation, the returning pulses interfere constructively and reflect back through the coupler input. Asymmetries resulting in a "$\pi$" phase shift cause the returning pulses to interfere destructively and to transmit through the coupler output. Other phase shifts divide the intensities of individual pulses between the coupler input and output in accordance with their relative amounts of constructive and destructive interference.

The asymmetries can be arranged to affect all data pulses equally or to have a differential effect on selected data pulses such as on data pulses with certain characteristics, on particular patterns of data pulses, or even on individual data pulses. For example, my recently issued U.S. Pat. No. 5,655,039, which is hereby incorporated by reference, constructs the loop of a non-linear optical loop mirror with dispersion-tapered fiber to produce a differential effect on data pulses having different widths or intensities. Individual data pulses or patterns of data pulses can be differentially affected by using specially timed control (clock) pulses, which limit asymmetric effects to periods of overlap with selected data pulses.

In a preferred mode of operation, the control pulse starts just ahead or just behind the expected position of the selected data pulse and ends in the opposite position. Between the two positions, the control pulse overlaps the selected data pulse for a sufficient duration and with a sufficient intensity to produce a $\pi$ phase shift along the entire selected data pulse. The phase shift is induced by temporary changes in the effective refractive index of the fiber loop in the presence of the control pulse, which has an intensity within the nonlinear optical regime of the fiber.

However, a variety of differential effects on data pulses causes them to drift from their expected positions—a phenomenon referred to as "timing jitter". Any delay between the expected arrivals of the control and selected data pulses reduces the transmission efficiency of the selected data pulse because less of the selected data pulse undergoes the required $\pi$ phase shift. The effects of timing jitter on transmission efficiency can be reduced by starting the control pulse farther behind the selected data pulse and ending the control pulse farther ahead of the selected data pulse (i.e., increase the so-called "walkoff distance"). However, the increased walkoff distance (as it approaches the bit period) can also contribute to increased crosstalk caused by the unintended transmission of adjacent pulses.

A convenient measure of how well timing jitter can be accommodated is the so-called "switching window", having a width defined as the full width at half maximum (FWHM) of a transmission efficiency curve plotted as a function of the relative delay between the control and selected data pulses. The optimum window width balances the need to accommodate timing jitter (i.e., minimize intensity variations between transmitted data pulses) with the need to avoid crosstalk (i.e., minimize transmission of unselected data pulses). The shape of the switching window can also be optimized to further these objectives. The top of the switching window is preferably flattened to reduce intensity variations within a limited range of timing jitter, and the sides are preferably steepened (i.e., approach a more nearly vertical slope) to reduce crosstalk. The ideal shape of a switching window is described by a rectangle function.

SUMMARY OF THE INVENTION

My invention improves performance of nonlinear optical loop mirrors (NOLMs) by adiabatically compressing pulses that are input to the loop. Such pulse compression reshapes a switching window to reduce both intensity variations among data pulses selected for transmission and crosstalk with the remaining data pulses. Both control pulses and data pulses can be adiabatically compressed before entering the loop, and the data pulses selected for transmission beyond the loop can be re-expanded after leaving the loop. Dispersion-tapered fibers (DTFs) or chirped fiber Bragg gratings are preferred for compressing and re-expanding the pulses.

One embodiment of my invention is a fiber optic device arranged for processing data pulses. The device includes a loop of optical fiber and a directional coupler joining two ends of the fiber to a common input and output. A pulse compressor connected to the coupler input reduces the width of data pulses entering the fiber loop.

The loop of fiber together with the directional coupler can be constituted as a nonlinear optical loop mirror. As such, the directional coupler (a) divides a train of the data pulses into two counter propagating trains of data pulses, (b) recombines paired pulses from the two trains, and (c) directs the recombined pulses between the input and output of the directional coupler in accordance with interference characteristics of the recombined pulses. Control pulses entering the loop vary the interference characteristics of the recombined pulses by an optical nonlinear mechanism known as "cross-phase modulation".

The nonlinear loop mirror receives both control pulses and data pulses and further transmits selected data pulses in accordance with relative amounts of overlap between individual control and data pulses. A switching window is defined in terms of pulse transmission efficiency as a function of relative delays between the overlapping control and data pulses. The pulse compressor compresses at least one of the control and data pulses for reshaping the switching window to reduce transmission efficiency variations among the selected pulses.

The control and data pulses can enter the loop through the same or different couplers. Similarly, a single pulse compressor can be used to compress both the control and data pulses, or two pulse compressors can be used to compress the control and data pulses separately. A single pulse compressor can also be used to compress just one or the other of the control and data pulses. A pulse expander can be connected to the output of the directional coupler for restoring the width of the data pulses selected for further transmission.

Both the pulse compressors and the pulse expanders can be constructed using axially varying fiber. Preferably, dispersion-decreasing fiber is used to compress pulses and dispersion-increasing fiber is used to expand pulses both using the mechanism of self-phase modulation. Chirped fiber Bragg gratings can also be used for these purposes.

My invention also provides for temporal filtering of the data pulses. The nonlinear optical loop mirror is arranged for transmitting energy of data pulses within a temporal band surrounding an intended position of the data pulses and for reflecting energy of data pulses beyond the temporal band. A pulse amplifier amplifies the transmitted pulses so that weaker pulses are restored to a desired minimum level of intensity, and a pulse clipper limits the intensity of the amplified pulses to a desired maximum level of intensity.

DETAILED DESCRIPTION

Figure 1:
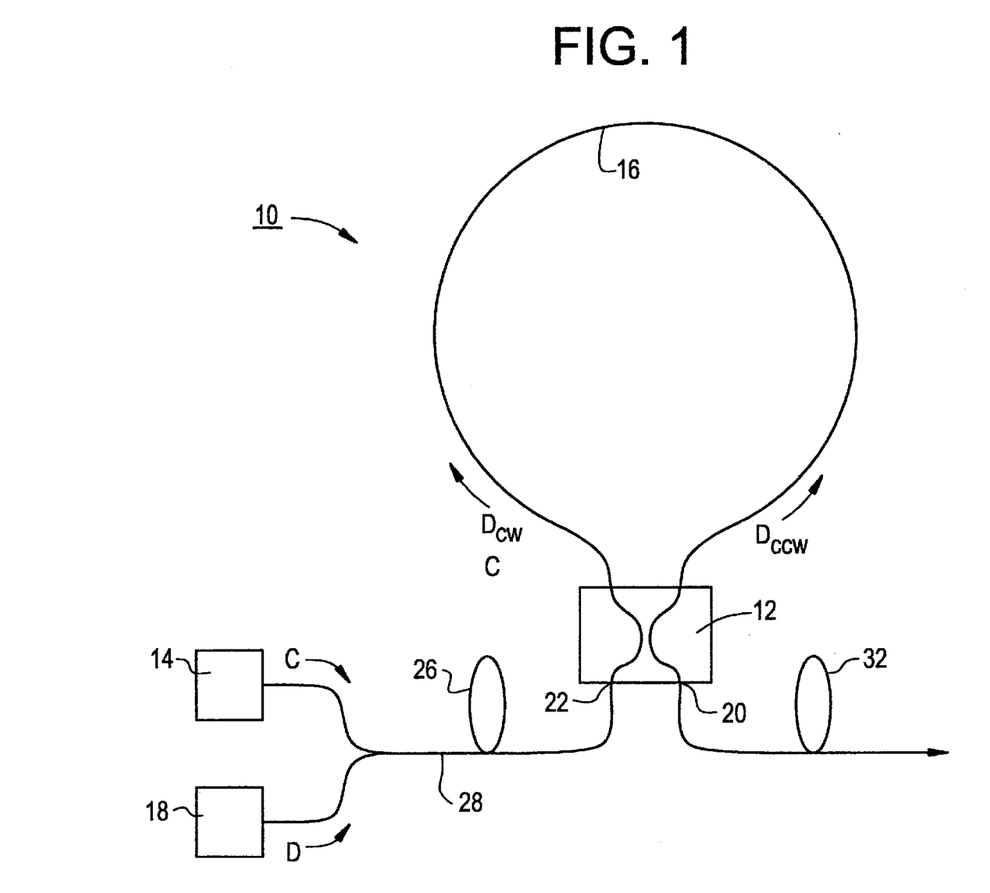
FIG. 1 is a diagram of a nonlinear optical loop mirror combined with a common pulse compressor for shortening the widths of data and control pulses.

A nonlinear optical loop mirror 10 depicted in FIG. 1 is arranged to receive both data pulses "D" and control pulses "C" through an achromatic directional coupler 12. The data pulses "D", which originate from a data source 14, are divided by the coupler 12 into pairs of pulses "$D_{cw}$" and "$D_{ccw}$" that propagate in opposite directions around a common fiber loop 16 with approximately equal intensities. The control pulses "C", which originate from a control source 18, propagate around the fiber loop 16 in the clockwise direction only.

The data source 14 and the control source 18 can take a variety of well-known forms. In the envisioned example of FIG. 1, the nonlinear optical loop mirror 10 functions as a demultiplexer, so the control pulses "C" are preferably generated by a clock, appropriately amplified and synchronized with selected data pulses "D". Within the loop 10, the control pulses "C" overlap at least some of the data pulses "$D_{cw}$" propagating in the clockwise direction.

Ordinarily, the control pulses "C" are designed to propagate at a slightly different speed than the data pulses "$D_{cw}$", starting just ahead or just behind selected ones of the data pulses "$D_{cw}$" and ending in the opposite position at the end of the fiber loop 16. The intensity of the control pulses "C" and their period of overlap are adjusted to produce a "$\pi$" phase shift in the selected data pulses "$D_{cw}$" by a mechanism of cross-phase modulation. (The effective refractive index of succeeding portions of the fiber loop 16 is momentarily altered by the passage of the control pulses "C".)

The amount of phase shift $\phi(t)$ induced by the control pulses "C" for a given wavelength "$\lambda_D$" of the data pulses "D" is given by the following equation:

$$\phi(t) = \frac{4\pi n_2}{\lambda_D A_{\mathit{eff}}} \int_0^L I_c(t - d_{12}z) dz \qquad (1)$$

where "$n_2$" is the nonlinear refractive index of the fiber loop 16, "$A_{\mathit{eff}}$" is the effective cross-sectional area of the fiber loop 16, "L" is the length of the fiber loop 16, "$I_c(t-d_{12}z)$" is the control pulse shape, "t" is the temporal spacing from the instantaneous center of the control pulse "C", "z" is the direction of propagation, and "$d_{12}$" is the relative delay between the wavelengths "$\lambda_D$" of the data pulses "D" and "$\lambda_c$" of the control pulses "C", measured as a difference between their inverse velocities in the fiber loop 16.

The optical intensity profile "$I_{Dout}(t)$" of the data pulses "D" that are transmitted or "switched" out of the loop mirror 10 is a function of the optical intensity profile "$I_{Din}(t)$" of the data pulses "D" entering the loop and the phase shift "$\phi(t)$" given in equation (1) as follows:

$$I_{Dout}(t) = I_{Din}(t) \frac{1 - \cos\phi(t)}{2} \qquad (2)$$

The total transmitted energy is an integral of the transmitted intensity "$I_{Dout}(t)$" from equation (2), and the efficiency is the total transmitted energy divided by the total input energy.

The data pulses "$D_{cw}$" that undergo a "$\pi$" phase shift interfere destructively with their paired data pulses "$D_{ccw}$" upon recombination within the directional coupler 12 and transmit through an output port 20 of the directional coupler 12. In accordance with equation (2), a phase shift "$\phi(t)$" equal to "$\pi$" over a common domain of time "t" equates the entering data pulse intensity "$I_{Din}(t)$" to the transmitted data pulse intensity "$I_{Dout}(t)$", resulting in 100% transmission efficiency. The remaining data pulses "D" that do not undergo any such relative phase shift (i.e., "$\phi(t)$" equal to zero) reflect back through an input port 22 of the coupler 12. The transmitted efficiency of the reflected data pulses "D" is 0.0%. Any phase shifts "$\phi(t)$" other than "$\pi$" produce partial transmissions and partial reflections of the data pulses "D" in accordance with their interference characteristics—more destructive interference enhancing transmission and more constructive interference enhancing reflection.

Typically, data pulses "D" that are perfectly synchronized with the control pulses "C" (i.e., zero delay) transmit most efficiently. This maximizes an interaction length between the data and control pulses "D" and "C", allowing a full "$\pi$" phase shift from cross-phase modulation to be induced along the entire intervals of the selected data pulses "D". Any variation in the arrival time of the data pulses "D" (either positive or negative timing jitter) can reduce their interaction length with the control pulses "C", resulting in phase shifts less than "$\pi$" and transmission efficiencies less than 100%.

Figure 2:
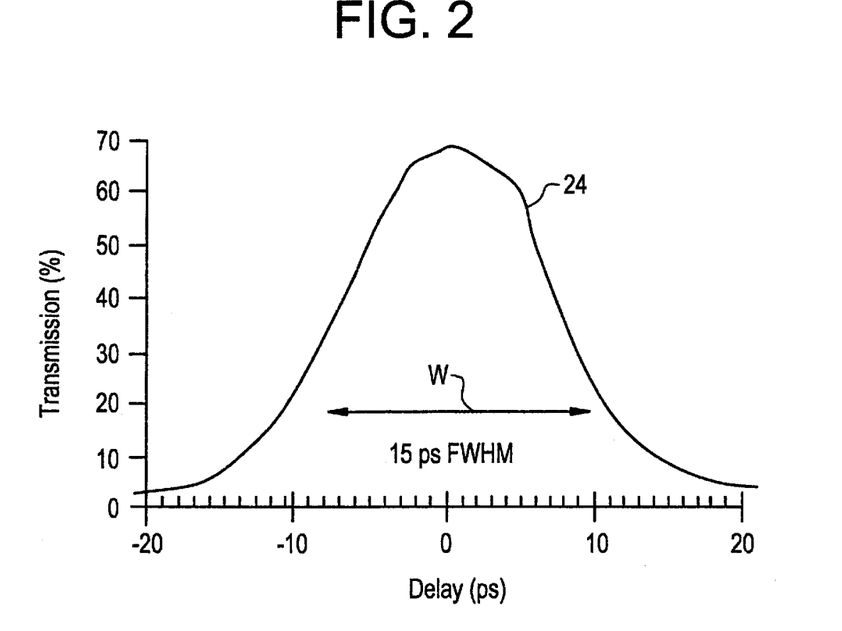
FIG. 2 is a graph of a typical switching window.

FIG. 2 depicts a typical plot of transmission efficiency as a function of the relative delay between data and control pulses "D" and "C". The resulting Gaussian-shaped curve 24 is referred to as a "switching window" having a width "W" measured at full-width-half-maximum (FWHM) of the curve 24. The switching window curve 24 is drawn for a 2.0 km loop with 8.0 picosecond (ps) wide control and data pulses at 1547 nm and 1555 nm wavelengths.

Transmission efficiencies within the width "W" of the switching window are preferably maximized to accommodate timing jitter (i.e., delays in the arrival of data pulses), and transmission efficiencies beyond the width "W" of the switching window are preferably minimized to reduce crosstalk (i.e., transmission of unselected adjacent data pulses "D"). According to this version of my invention, the shape of the switching window is optimized to accomplish these goals by shortening pulse widths of the data pulses "D" and control pulses "C" in advance of the directional coupler 12. The data and control pulses "D" and "C" are compressed by a pulse compressor 26, such as a dispersion-tapered fiber or a chirped fiber Bragg grating, located along an optical path 28 between the data and control sources 14 and 18 and the input port 22 of the directional coupler 12.

The ideal switching window shape is described by a rectangle or square-topped function. Data pulses "D" arriving within the width "W" of such a switching window are completely transmitted without loss of energy, and data pulses "D" arriving outside the window width "W" are completely reflected. Thus, some timing jitter can be accommodated within the window width "W" without loss of efficiency, while no undesired energy is transmitted to pulses outside the window width "W" for avoiding crosstalk and intersymbol interference.

As the temporal widths of the data and control pulses "D" and "C" become shorter, the switching window approaches the ideal rectangular shape. This can be shown with the aid of equations (1) and (2). For a rectangular-shaped switching window, the phase shift "$\phi(t)$" of equation (1) must also have a rectangular shape. This is achieved as the control pulses "C" approach the limit of zero width, i.e., as the control pulses "C" approximate a Dirac delta function "$|I_c|\delta(t-d_{12}z)$" where "$|I_c|$" is the peak intensity of the control pulses "C". The integral of equation (1) becomes:

$$\phi(t) = \frac{4\pi n_2 |I_c|}{\lambda_d A_{eff}} \quad \text{for } t \leq d_{12}L \quad (3)$$

$$\phi(t) = 0 \quad \text{for } t > d_{12}L \quad (4)$$

For practical applications, control pulse widths in the range of 1 picoseconds to 2 picoseconds achieve the desired effect of equations (3) and (4). If the data pulses "D" arrive and are fully contained within the bounds of equation (3) (i.e., the phase window), then efficient transmission occurs. This also implies from equation (2) that the data pulse intensity "$I_{Din}(t)$" should approach zero under the conditions of equation (4) (i.e., $I_{Din}(t) \cong 0$ for $t > d_{12}L$). Since any data pulse energy outside of the phase window of the control pulses is not transmitted, short data pulses "D" are desired. In effect, the shortened data pulses "D" steepen the sides of the switching window.

Figure 3:
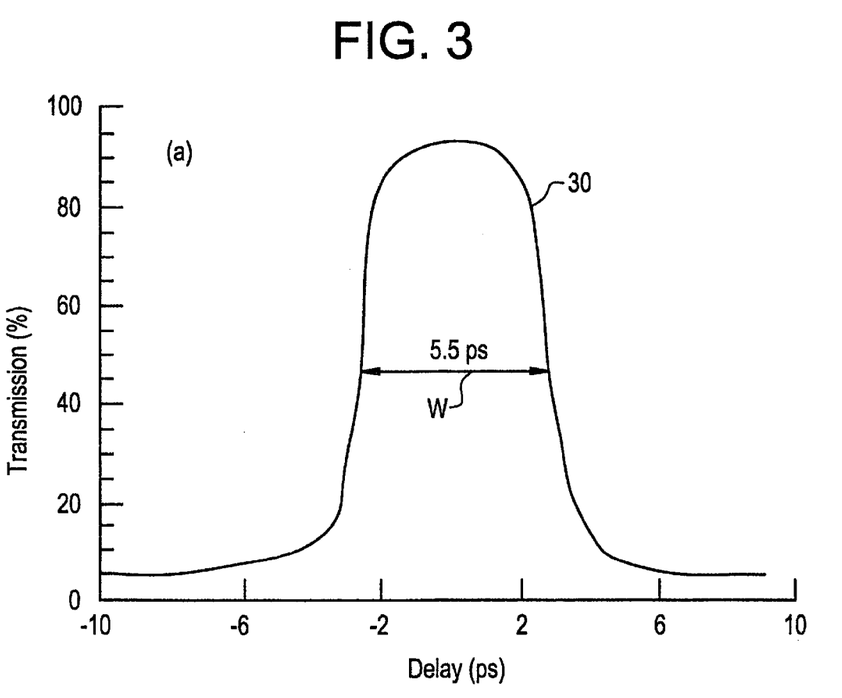
FIG. 3 is a graph showing a switching window modified by shortening the widths of both data and control pulses.

Preferably, the data and control pulses "D" and "C" are adiabatically compressed to a width (FWHM) of 2.0 picoseconds (ps) or less with a limit near 1.0 picoseconds to avoid higher order nonlinearities. The graph of FIG. 3 shows a revised switching window curve 30 for 2.0 picosecond data and control pulses "D" and "C" propagating around the fiber loop 16. With respect to the switching window curve 24 for the 8.0 picosecond pulses, the switching window curve 30 for the 2.0 picosecond pulses is more rectangular, yielding less variation among the transmission efficiencies within the switching window width "W" and more rapid decay of transmission efficiencies just beyond the switching window width "W".

Preferably, the width "W" of the switching window occupies at least two-thirds of the data pulse bit period and is a multiple of at least 5 times the width of the data pulses "D" to achieve the desired shape of the switching window. Narrowing the data pulses "D" also increases the normalized spacing between data pulses in the fiber loop 16 from a typical multiple of 3 to 5 times the pulse width to a multiple of more than 7 times the pulse width. Normalized spacing is defined as the bit period divided by the full-width-half-maximum pulse width.

The reduced-width data pulses emerging from the output port 20 of the coupler 12 are re-expanded by a pulse expander 32, which can also be formed by an axially varying fiber such as a dispersion-tapered fiber or a chirped fiber Bragg grating. Dispersion-tapered fibers change pulse widths by imbalancing the counteracting mechanisms of self-phase modulation and dispersion.

The dispersion-tapered fiber of the pulse compressor 26 is preferably a dispersion-decreasing fiber for shortening pulse widths, and the dispersion-tapered fiber of the pulse expander 32 is preferably a dispersion-increasing fiber for lengthening pulse widths. If desired, the dispersion-tapered fiber of the pulse expander 32 can restore the data pulses "D" to their width just prior to having been shortened by the dispersion-tapered fiber of the pulse compressor 26. Thus, shorter data pulses "D" with larger spacing can be used for optimizing the switching functions of the nonlinear optical loop mirror 10, while more stable longer pulses with closer spacing can be restored for optimizing longer transmissions.

Dispersion-tapered fibers can be made in a variety of ways including axially tapering the core diameter or axially varying the refractive index profile during the glass forming process or axially varying the fiber cladding diameter during the fiber drawing process.

A dispersion profile "$D(z)$" along fiber length "$z$" can be expressed as follows:

$$D(z) = D(0)^{-Az/(1+Bz)} \quad (5)$$

where "A" and "B" are constants chosen to satisfy the following two conditions:

1. The rate of dispersion change is faster than the optical attenuation rate of the fiber.
2. The rate of dispersion change is slow on the dispersive length scale.

The first condition ensures that the width of the input pulse will be changed as the pulse propagates along the fiber. In other words, self-phase modulation is stronger than the fiber dispersion. As a result, new frequency components are generated. For dispersion-decreasing fibers, the new components add to (i.e., broaden) the optical spectrum and narrow the pulse in the temporal domain. For dispersion-increasing fibers, the new components subtract from (i.e., narrow) the optical spectrum and broaden the pulse in the temporal domain. The second condition ensures that this imbalance between self-phase modulation and dispersion is not too large so as to produce a frequency variation across the pulse (known as chirp), which results in energy being shed from the pulse in the form of dispersive waves. The dispersive length of a pulse is defined as the dispersion divided by the square of the pulse width. For a more gradual adiabatic pulse compression, the dispersion change should occur over several dispersive lengths.

Figure 4:
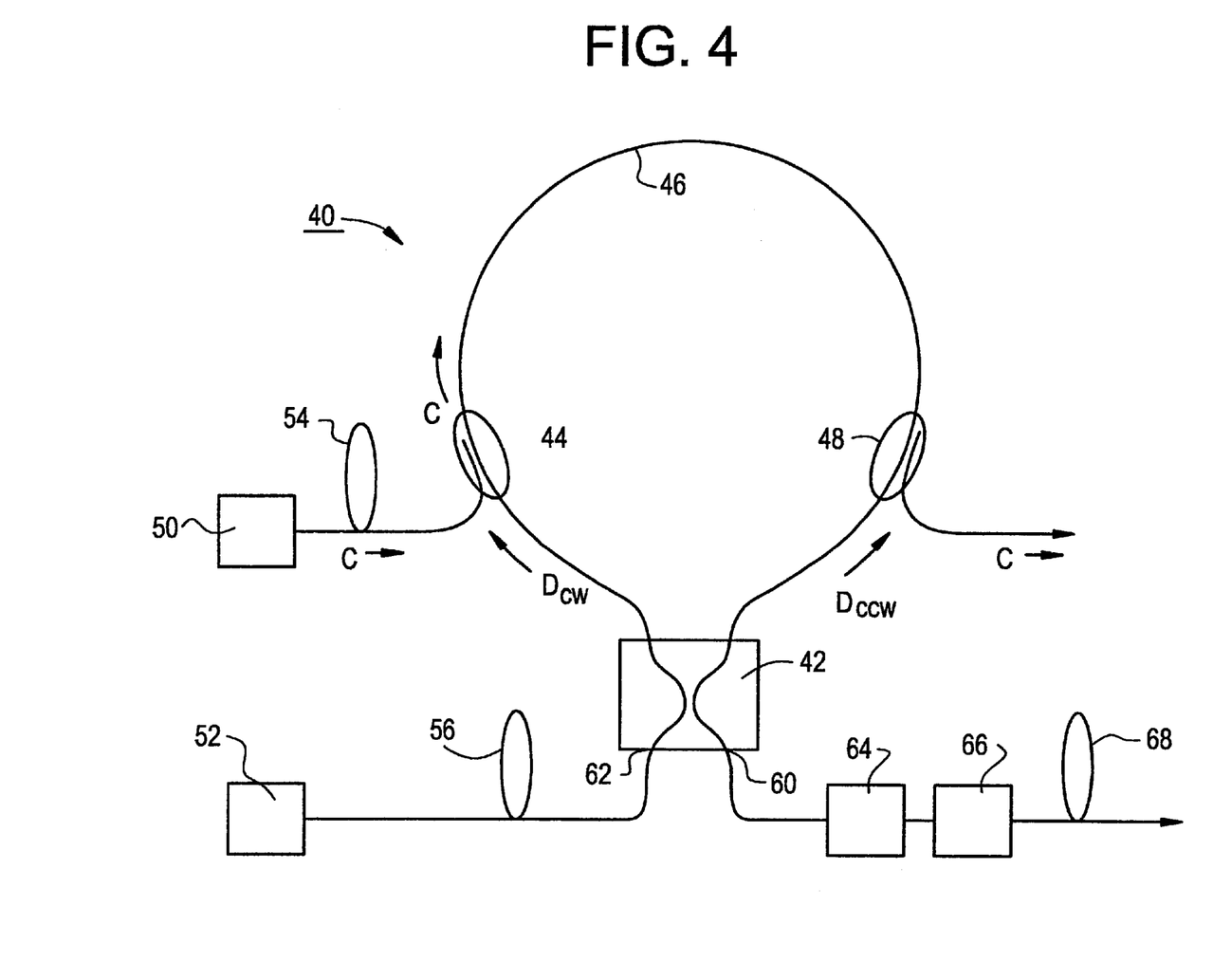
FIG. 4 is a diagram of a nonlinear optical loop mirror combined with separate pulse compressors for shortening the widths of data and control pulses and other pulse shapers for supporting temporal filtering functions in addition to pulse switching functions.

Another nonlinear optical loop mirror 40 is depicted in FIG. 4. In contrast to the nonlinear optical loop mirror 10, the nonlinear optical loop mirror 40 has separate couplers 42 and 44 for coupling data pulses "D" and control pulses "C" to a fiber loop 46. The coupler 42 is preferably a 3 dB directional coupler for dividing the data pulses "D" into pairs of counter propagating pulses "$D_{cw}$" and "$D_{ccw}$" of equal intensity. The coupler 44 is preferably a wavelength division multiplexer (WDM) having a period for joining control pulses "C" having particular wavelengths "$\lambda_c$" to the fiber loop 46. Another WDM coupler 48 separates the control pulses "C" from the fiber loop 46.

Other coupling mechanisms could also be used. For example, the control and data pulses "C" and "D", which originate from respective sources 50 and 52, could be formed from the same wavelength of light but in different polarizations. The fiber loop 46 would be constructed from a polarizing maintaining fiber, and the couplers 44 and 48 would be polarization couplers for joining and separating the different polarization control pulses to and from the fiber loop 46.

Separate pulse compressors 54 and 56, which again take the form of dispersion-tapered fibers or chirped fiber Bragg gratings, shorten the pulse widths of the control pulses "C" and data pulses "D". Since the control pulses "C" can be different in several respects from the data pulses "D" (including intensity, wavelength, and shape), the separate pulse compressors 54 and 56 permit better control over the pulse width reductions of the control and data pulses "C" and "D".

Upon entering the fiber loop 46, the shortened control pulses "C" are designed to produce a "$\pi$" phase shift between the pairs of shortened counter propagating data pulses "$D_{cw}$" and "$D_{ccw}$". Improved switching results similar to the results illustrated in FIG. 3 can be achieved. However, in addition to accommodating timing jitter among data pulses "D", my invention can also be used to correct timing jitter.

Figure 5:
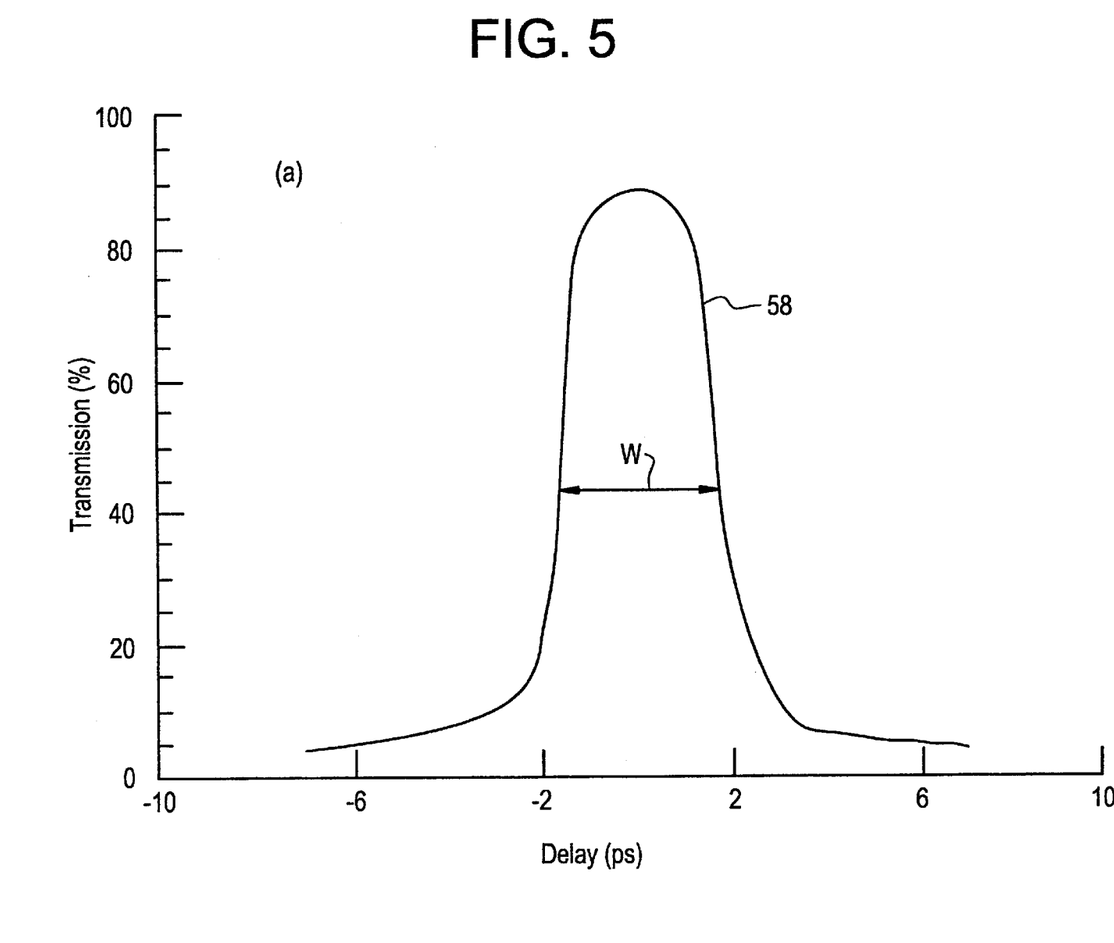
FIG. 5 is a graph showing a switching window for performing the temporal filtering and selecting functions.

FIG. 5 depicts a switching window curve 58 that has been further narrowed in width to transmit data pulses "D" or portions of data pulses "D" within a narrow temporal band (e.g., 10 percent) of their expected timing position. The control and data pulses "C" and "D" are still preferably shortened to increase the normalized pulse spacing and to sharpen the sides of the switching window, but the walkoff distance between the control and data pulses is preferably further limited to also shorten the switching window width "W".

The switching window width "W" is preferably set so that at least some portion of each data pulse "D" is transmitted through output port 60 of the coupler 42, while any significant energy of the data pulses "D" beyond a limited temporal band surrounding the intended position of the data pulses is reflected back through input port 62 of the coupler 42. An amplifier 64 receives the temporally filtered data pulses "D" from the output port 60 and amplifies the pulses so that the weakest expected pulses are restored to a desired minimum level of intensity. A pulse clipper 66 follows the amplifier 64 for limiting the intensities of the pulses "D" to a desired maximum level of intensity. A pulse expander 68, which can be positioned on either side of the amplifier 64 and pulse clipper 66, can be used to restore the width of the data pulses "D" to a desired width for further transmission.

The control pulses "C" can be timed to interact with all of the data pulses "D" for performing the temporal filtering function, or the control pulses "C" can be timed to interact with selected data pulses "D" for also performing a switching operation such as demultiplexing. In the latter case, the selected data pulses are isolated from a train of data pulses and reshaped to reduce timing errors between them. The temporal filtering and switching operations could also be performed sequentially with a different nonlinear optical loop mirror arranged for performing each function.

As a filter, the loop mirror 40 restores the data pulses "D" to the center of the timing window. However, the loop mirror 40 should be positioned in transmission systems at an interval that limits any significant temporal delays of the date pulses "D" to within the switching window width "W". In addition to correcting temporal delays of data pulses, the loop mirror 40 can also be used to reduce amplified spontaneous emission from optical amplifiers as well as background dispersive waves.

While I have described embodiments of my invention as a demultiplexer and filter, my invention can also be embodied in a number of other kinds of devices including logic gates and other devices that perform such functions as switching, routing, reshaping, or regenerating pulses. My invention can also be used in combination with other devices including pulse generators and amplifiers for enhancing their performance.

I claim:

1. A fiber optic device for optically processing data pulses comprising:
   a loop of optical fiber having two ends;
   a directional coupler joining said two ends of the loop to a common input and output; and
   a pulse compressor operatively associated with said input of the directional coupler for reducing the width of data pulses entering said directional coupler.

2. The device of claim 1 in which:
   said directional coupler is arranged to divide a train of the data pulses into two counter propagating trains of data pulses, to recombine paired pulses from the two trains, and to direct the recombined pulses between said input and output of the directional coupler in accordance with interference characteristics of the recombined pulses; and
   control pulses entering the loop are used to vary the interference characteristics of the recombined pulses by cross-phase modulation.

3. The device of claim 2 in which said pulse compressor is arranged to compress both the data pulses and the control pulses entering the loop.

4. The device of claim 3 in which said directional coupler is also arranged to direct control pulses in a single direction of propagation around the loop, and said pulse compressor is operatively associated with said directional coupler for reducing the width of both the data pulses and the control pulses entering said directional coupler.

5. The device of claim 4 in which said pulse compressor is a dispersion-tapered fiber.

6. The device of claim 4 in which said pulse compressor is a Bragg grating.

7. The device of claim 2 in which said pulse compressor is a first pulse compressor for compressing the data pulses entering the loop and further comprising a second pulse compressor for separately compressing the control pulses entering the loop.

8. The device of claim 7 in which said second pulse compressor is arranged with respect to said first pulse compressor for compressing the control pulses differently from the data pulses.

9. The device of claim 7 further comprising a separate coupler through which the control pulses enter the loop, and said second pulse compressor being operatively associated with said separate coupler for reducing the width of the control pulses entering said separate coupler.

10. The device of claim 9 in which said second pulse compressor is a dispersion-tapered fiber.

11. The device of claim 9 in which said second pulse compressor is a Bragg grating.

12. The device of claim 1 further comprising a pulse expander operatively associated with said output of the directional coupler for increasing the width of data pulses leaving said directional coupler.

13. The device of claim 12 in which said pulse expander is arranged to restore the width of the data pulses to their width just prior to their compression by said pulse compressor.

14. The device of claim 1 further comprising a pulse amplifier and a pulse clipper operatively associated with said output of the directional coupler for reshaping the data pulses leaving said directional coupler.

15. An apparatus for optically processing data pulses comprising:
    a nonlinear optical loop mirror in combination with an axially varying fiber that conveys optical pulses to the loop mirror;
    said nonlinear loop mirror being arranged for receiving both control pulses and data pulses and for further transmitting selected data pulses in accordance with relative amounts of overlap between individual control and data pulses;
    said nonlinear loop mirror exhibiting a switching window defined as pulse transmission efficiency as a function of relative delays between the overlapping control and data pulses; and
    said axially varying fiber being arranged for compressing at least one of the control and data pulses for reshaping the switching window to reduce variations in the transmission efficiency of the selected pulses.

16. The apparatus of claim 15 in which said axially varying fiber is a dispersion-tapered fiber.

17. The apparatus of claim 15 in which said axially varying fiber is a fiber Bragg grating.

18. The apparatus of claim 15 in which said axially varying fiber is arranged for compressing the control pulses entering said nonlinear loop mirror.

19. The apparatus of claim 15 in which said axially varying fiber is arranged for compressing the data pulses entering said nonlinear loop mirror.

20. The apparatus of claim 19 in which said switching window has a width that is at least 5 times as large as the width of the data pulses entering said nonlinear loop mirror.

21. The apparatus of claim 15 in which said axially varying fiber is arranged for compressing both the control and data pulses entering said nonlinear loop mirror.

22. The apparatus of claim 15 in which said axially varying fiber is one of a first and second axially varying fibers, said first axially varying fiber being arranged for compressing the data pulses entering said nonlinear loop mirror and said second axially varying fiber being arranged for compressing the control pulses entering said nonlinear loop mirror.

23. The apparatus of claim 15 in which said axially varying fiber is one of a first and second axially varying fibers, said first axially varying fiber being arranged for compressing the data pulses entering said nonlinear loop mirror and said second axially varying fiber being arranged for re-expanding the data pulses upon leaving said nonlinear loop mirror.

24. An apparatus for processing optical pulses comprising:
    a pulse compressor that shortens pulse widths of optical pulses by a mechanism of self-phase modulation;
    a switching device that separates certain pulses from a train of optical pulses for further transmission using a mechanism of cross-phase modulation; and
    said pulse compressor being operatively associated with said switching device for shortening pulse widths of optical pulses entering said switching device for improving efficiency of the switching device.

25. The apparatus of claim 24 in which said pulse compressor is arranged for shortening pulse widths of the train of optical pulses.

26. The apparatus of claim 25 further comprising a pulse expander for lengthening the pulse widths of the certain pulses transmitted from said switching device.

27. The apparatus of claim 24 in which said pulse compressor is arranged for shortening pulse widths of control pulses that are used for separating the certain pulses within said switching device.

28. The apparatus of claim 27 in which said pulse compressor is also arranged for shortening pulse widths of the train of optical pulses.

29. The apparatus of claim 24 in which said pulse compressor is one of a first and second pulse compressors, said first pulse compressor being arranged for shortening pulse widths of the train of optical pulses and said second pulse generator being arranged for shortening pulse widths of control pulses that are used for separating the certain pulses within said switching device.

30. The apparatus of claim 24 in which said pulse compressor is an axially varying fiber, and said switching device is a non-linear optical loop mirror.

31. The apparatus of claim 24 in which said switching device is arranged to transmit the energy of data pulses within a temporal band surrounding an intended position of the data pulses and to reflect the energy of data pulses beyond the temporal band.

32. The apparatus of claim 31 further comprising a pulse amplifier that amplifies the selected pulses so that weaker data pulses are restored to a desired minimum level of intensity.

33. The apparatus of claim 32 further comprising a pulse clipper following said amplifier for limiting the intensity of the selected data pulses to a desired maximum level of intensity.

34. The apparatus of claim 24 in which said pulse compressor shortens pulse widths by counteracting dispersion with self-phase modulation.

35. A method of processing data pulses comprising the steps of:
    dividing a train of data pulses into succeeding pairs of pulses propagating in opposite directions around a common optical loop;
    overlapping one of the members of selected pairs of pulses with control pulses propagating in a common direction around the loop for varying a phase relationship between the members of the selected pairs;
    recombining the succeeding pairs of pulses;
    transmitting some of the recombined pulses and not transmitting other of the recombined pulses in accordance with interference characteristics of the recombined pulses; and compressing the train of data pulses prior to said step of dividing the train for reducing intensity variations among the transmitted pulses.

36. The method of claim 35 in which said step of compressing the train of data pulses includes transmitting the train of data pulses through an axially varying fiber.

37. The method of claim 36 in which said axially varying fiber is a dispersion-tapered fiber.

38. The method of claim 36 in which said axially varying fiber is a fiber Bragg grating.

39. The method of claim 35 in which said step of compressing the train of data pulses is carried out by a mechanism of self-phase modulation.

40. The method of claim 35 including the further step of compressing the control pulses prior to said step of overlapping one of the members.

41. The method of claim 40 in which the said steps of compressing the control and data pulses include relatively adjusting pulse widths of the control pulses with respect to pulse widths of the data pulses.

42. The method of claim 35 including the further step of re-expanding the transmitted pulses.

43. The method of claim 35 in which said step of compressing the train of data pulses includes compressing the data pulses to a pulse width of less than two picoseconds.

44. The method of claim 35 in which said step of transmitting some of the recombined pulses includes transmitting the energy of data pulses within a temporal band surrounding an intended position of the data pulses and reflecting the energy of data pulses beyond the temporal band.

45. The method of claim 44 including the further step of amplifying the transmitted pulses so that weaker pulses are restored to a desired minimum level of intensity.

46. The method of claim 45 including the further step of limiting the intensity of the amplified pulses to a desired maximum level of intensity.

47. A method of switching selected data pulses from a train of data pulses comprising the steps of:

coupling data and control pulses to a nonlinear optical loop mirror;

selecting some of the data pulses propagating within the nonlinear optical loop mirror for further transmission using a mechanism of cross-phase modulation; and compressing at least one of the data and control pulses prior said step of coupling using a mechanism of self-phase modulation for more efficiently transmitting the selected data pulses.

48. The method of claim 47 in which said step of compressing includes compressing the control pulses using the mechanism of self-phase modulation.

49. The method of claim 47 in which said step of compressing includes compressing the data pulses using the mechanism of self-phase modulation.

50. The method of claim 49 including the further step of re-expanding the data pulses using the mechanism of self-phase modulation.

51. The method of claim 47 in which said step of compressing includes compressing the at least one of the data and control pulses to a pulse width of less than two picoseconds.

52. The method of claim 47 in which said step of compressing includes compressing the data pulses to a pulse width of less than two picoseconds.

53. An apparatus for optically processing data pulses comprising:

a nonlinear optical loop mirror arranged for transmitting energy of data pulses within a temporal band surrounding an intended position of the data pulses and for reflecting energy of data pulses beyond the temporal band;

a pulse amplifier for amplifying the transmitted pulses so that weaker pulses are restored to a desired minimum level of intensity; and a pulse clipper for limiting the intensity of the amplified pulses to a desired maximum level of intensity.

54. The apparatus of claim 53 in which said nonlinear loop mirror is arranged for receiving both control pulses and data pulses and transmits portions of the data pulses in accordance with relative amounts of overlap between individual control and data pulses.

55. The apparatus of claim 54 further comprising a pulse compressor for compressing at least one of the control and data pulses for more sharply defining the temporal band surrounding the intended position of the data pulses.

56. The apparatus of claim 55 further comprising a pulse expander for expanding the transmitted pulses for further transmission.

57. The apparatus of claim 53 in which said nonlinear optical loop mirror is a first of two nonlinear optical loop mirrors, and a second optical loop mirror is arranged for receiving both control pulses and data pulses and for further transmitting selected data pulses in accordance with relative amounts of overlap between individual control and data pulses.

58. A method of optically processing data pulses comprising the steps of:

using a nonlinear optical loop mirror for transmitting energy of data pulses within a temporal band surrounding an intended position of the data pulses and for reflecting energy of data pulses beyond the temporal band;

amplifying the transmitted pulses so that weaker pulses are restored to a desired minimum level of intensity; and limiting the intensity of the amplified pulses to a desired maximum level of intensity.

59. The method of claim 58 including the further step of coupling data and control pulses to a nonlinear optical loop mirror.

60. The method of claim 59 including the further step of selecting some of the data pulses propagating within the nonlinear optical loop mirror for further transmission using a mechanism of cross-phase modulation.

61. The method of claim 59 including the further step of compressing at least one of the data and control pulses prior to said step of coupling.

62. The method of claim 61 in which said step of compressing includes using a mechanism of self-phase modulation for compressing the pulses.

* * * * *